United States Patent
Bouchet et al.

(10) Patent No.: US 12,005,536 B2
(45) Date of Patent: Jun. 11, 2024

(54) METHOD OF SURFACE TEXTURING FOR A WRITING INSTRUMENT TIP

(71) Applicant: Société BIC, Clichy (FR)

(72) Inventors: Julien Bouchet, Montevrain (FR); Stéphane Larue, Montevrain (FR); Eric Pestour, Montevrain (FR)

(73) Assignee: Société BIC, Clichy (FR)

(*) Notice: Subject to any disclaimer, the term of this patent is extended or adjusted under 35 U.S.C. 154(b) by 114 days.

(21) Appl. No.: 17/753,218

(22) PCT Filed: Sep. 11, 2020

(86) PCT No.: PCT/EP2020/075464
§ 371 (c)(1),
(2) Date: Feb. 24, 2022

(87) PCT Pub. No.: WO2021/048346
PCT Pub. Date: Mar. 18, 2021

(65) Prior Publication Data
US 2022/0288728 A1      Sep. 15, 2022

(30) Foreign Application Priority Data
Sep. 11, 2019   (EP) .................... 19306094

(51) Int. Cl.
*B43K 1/08*   (2006.01)
*B21D 22/02*  (2006.01)
(Continued)

(52) U.S. Cl.
CPC ........... *B23P 15/00* (2013.01); *B21D 22/025* (2013.01); *B43K 1/084* (2013.01); *B43K 7/10* (2013.01)

(58) Field of Classification Search
CPC ...................................... B23P 15/00
See application file for complete search history.

(56) References Cited

U.S. PATENT DOCUMENTS

| 3,303,825 A | 2/1967 | Cowan et al. |
| 3,315,347 A * | 4/1967 | Schachter ............ B43K 1/08 29/525 |
| 3,708,234 A | 1/1973 | Fukuda |

FOREIGN PATENT DOCUMENTS

| DE | 102019202346 A1 * | 8/2019 | ............ B43K 1/084 |
| DE | 102019202346 A1 | 8/2019 | |

OTHER PUBLICATIONS

DE-102019202346-A1 English translation (Year: 2019).*
(Continued)

*Primary Examiner* — Jason L Vaughan
*Assistant Examiner* — Amanda Kreiling
(74) *Attorney, Agent, or Firm* — Bookoff McAndrews, PLLC (57) ABSTRACT

A method of manufacturing a metallic ball pen tip for a writing instrument comprising a feeding passage extending in an axial direction, the feeding passage reaching in a housing configured to receive a ball, the housing being defined by a cylindrical wall and a wall, the method comprising the steps providing a preform of the metallic ball pen tip comprising the feeding passage and the housing, the housing being defined by the cylindrical wall and a wall, machining the wall so as to obtain a stepped wall, broaching feeding grooves in the stepped wall and coining the stepped wall with a spherical die so as to obtain the ball seat, and a metallic ball pen tip obtained by the method.

20 Claims, 6 Drawing Sheets

(51) Int. Cl.
*B23P 15/00* (2006.01)
*B43K 7/10* (2006.01)

(56) References Cited

OTHER PUBLICATIONS

International Search Report and Written Opinion issued in International Application No. PCT/EP2020/075464, dated Nov. 11, 2020 (12 pages).

* cited by examiner

METHOD OF SURFACE TEXTURING FOR A WRITING INSTRUMENT TIP

CROSS REFERENCE TO RELATED APPLICATION(S)

This application is a National Stage Application of International Application PCT/EP2020/075464, filed on Sep. 11, 2020, now published as WO2021048346 and which claims priority from European patent application 19306094.4, titled: "METHOD OF SURFACE TEXTURING FOR A WRITING INSTRUMENT TIP", filed on Sep. 11, 2019, its content being incorporated herein by reference.

TECHNICAL FIELD

The present disclosure is related to a writing instrument, and more particularly to a handwriting instrument having a ball tip.

BACKGROUND

Metallic ball pen tips are known and comprise a ball received in a housing, the ink being delivered on the writing support, such as a sheet of paper, by a ball received in a housing of the ball pen tip, the ball moving relative to a ball seat of the ball pen tip.

SUMMARY

Currently, it remains desirable to improve the smoothness of writing and to reduce tip wear.

Therefore, according to embodiments of the present disclosure, a method of manufacturing a metallic ball pen tip for a writing instrument is provided. The metallic ball pen tip includes a feeding passage extending in an axial direction, the feeding passage reaching in a housing configured to receive a ball, the housing being defined by a cylindrical wall and a ball seat, wherein the ball seat comprises a plurality of feeding grooves and wherein the ball seat is textured, the method comprising the steps of:
- providing a preform of the metallic ball pen tip comprising the feeding passage and a housing preform, the housing preform being defined by the cylindrical wall and a ball seat preform wall;
- machining the ball seat preform wall so as to obtain a stepped wall;
- broaching the feeding grooves in the stepped wall;
- coining the stepped wall with a spherical die so as to obtain the ball seat.

The ball seat preform wall may form an angle with the axial direction equal to or greater than 0°, specifically equal to or greater than 20° and equal to or smaller than 80°, specifically equal to or smaller than 55°.

The machining of the ball seat preform wall may be carried out in two steps, a first step of machining a first group of steps and a second step of machining a second group of steps, the steps of the first group being alternated with the steps of the second group.

Each step may have a depth, measured in a radial direction perpendicular to the axial direction, equal to or greater than 10 µm, specifically equal to or greater than 25 µm and equal to or smaller than 50 µm, specifically equal to or smaller than 40 µm.

Each step may have a height, measured in the axial direction, equal to or greater than 10 µm, specifically equal to or greater than 13 µm and equal to or smaller than 60 µm, specifically equal to or smaller than 50 µm.

The spherical die may be pressed in the axial direction with a force equal to or greater than 40 N, specifically equal to or greater than 93 N.

The spherical die may be made of hard carbides, specifically tungsten carbide.

The stepped wall may comprise five steps.

The metallic ball pen tip may be made of a metallic alloy comprising brass or nickel silver or stainless steel.

According to embodiments of the present disclosure, a metallic ball pen tip for a writing instrument is provided. The metallic ball pen tip is manufactured by the above-described method.

With such a method, it is possible to manufacture a metallic ball pen tip for a writing instrument with a textured ball seat. The textured ball seat allows improving the smoothness of writing and to reduce tip wear. Thanks to the texture of the ball seat, it is possible to ensure the presence of a continuous layer of ink between the ball and the ball seat, the continuous layer of ink allowing for smoothness in writing.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
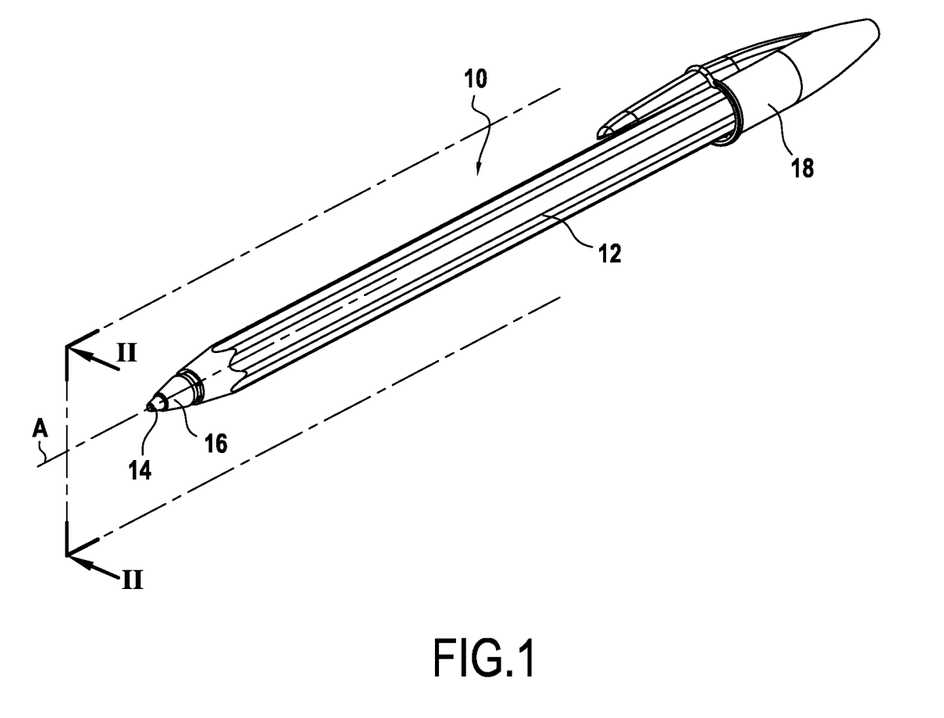
FIG. 1 shows a representation of an exemplary writing instrument according to embodiments of the present disclosure.

FIG. 1 shows a representation of an exemplary writing instrument 10 according to embodiments of the present disclosure. The writing instrument 10 may include a body 12 extending along an axial direction A. The writing instrument may comprise a metallic ball pen tip 14, which is mounted on the body 12 of the writing instrument 10 through a mounting sleeve 16. The writing instrument 10 may also comprise a cap 18 for protecting the metallic ball pen tip 14.

Figure 2:
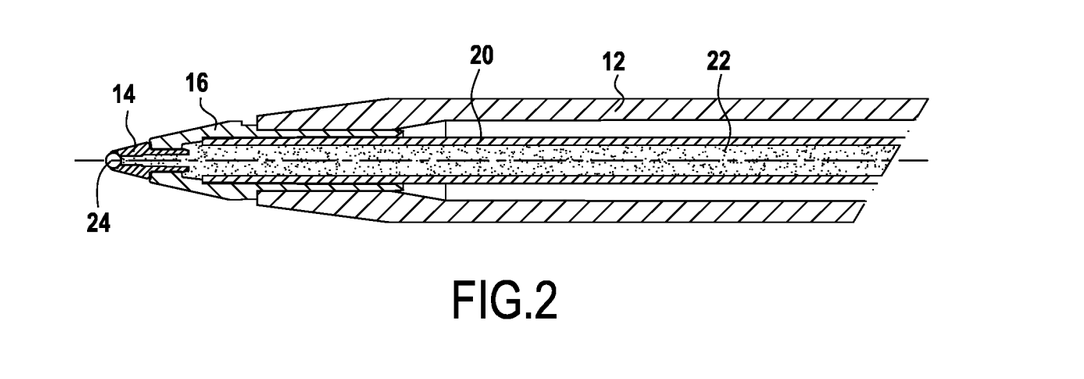
FIG. 2 shows a cross-section along II-II of the exemplary writing instrument of FIG. 1.

As can be seen on FIG. 2, the mounting sleeve 16 may also connect the metallic ball pen tip 14 to an ink reservoir 20. The ink reservoir 20 stores ink 22 which is to be delivered by a ball 24 received in the metallic ball pen tip 14. The ink reservoir 20 may be in fluidic connection with the ball 24 through the mounting sleeve 16 and the metallic ball pen tip 14.

The metallic ball pen tip 14 may be made of brass or nickel silver or stainless steel, for example.

Figure 7:
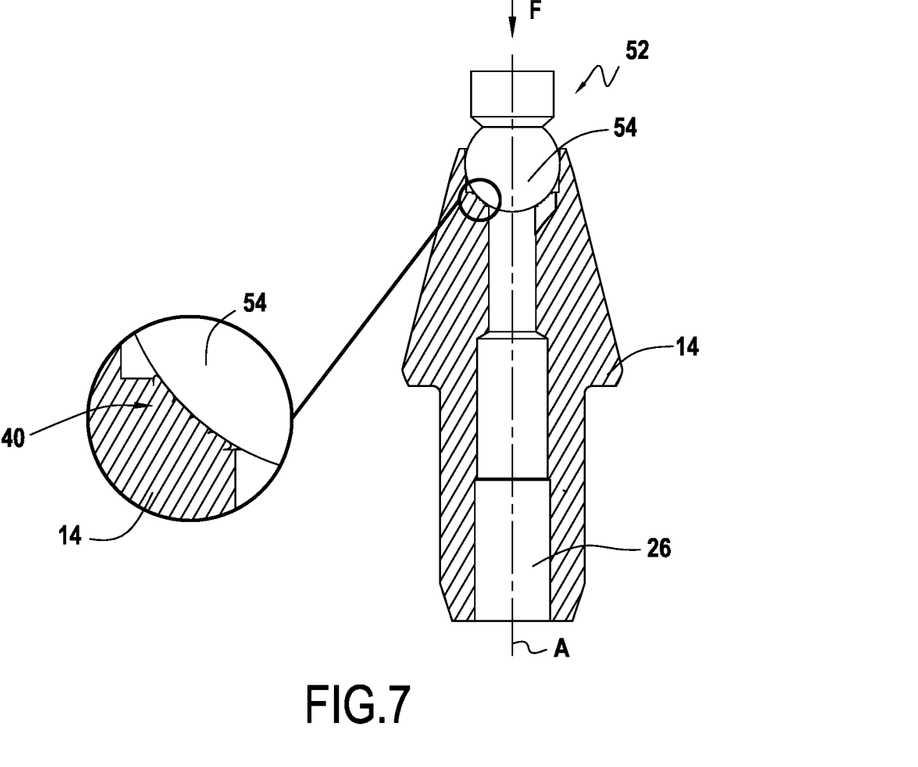
FIG. 7 shows a cross-section of the machined metallic ball pen tip of FIG. 6 during coining.
Figure 8:
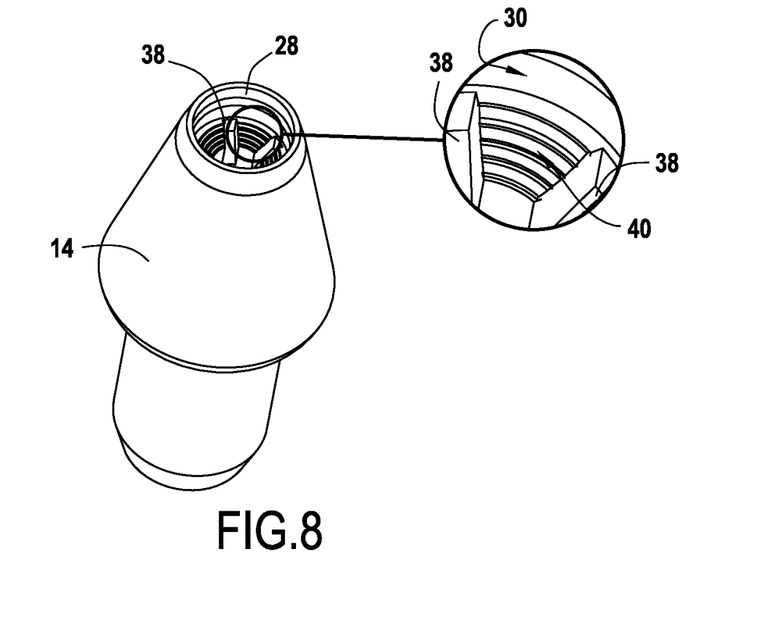
FIG. 8 shows an exemplary metallic ball pen tip for a writing instrument with a textured ball seat according to embodiments of the present disclosure obtained from the preform of FIG. 4.

As shown in FIG. 7, the metallic ball pen tip 14 may comprise a feeding passage 26 extending in the axial direction A. The feeding passage 26 may extend from one axial end of the metallic ball pen tip 14 to a housing 28. As shown in FIG. 8, the housing may be defined by a cylindrical wall 30 and a ball seat 40. The ball seat 40 may comprise a plurality of feeding grooves 38. The feeding grooves 38 may allow the ink 22 to flow from the ink reservoir 20 into the housing 28, especially when the ball 24 is received in the housing 28.

As shown in FIG. 7, the ball seat 40 is textured.

Figure 3:
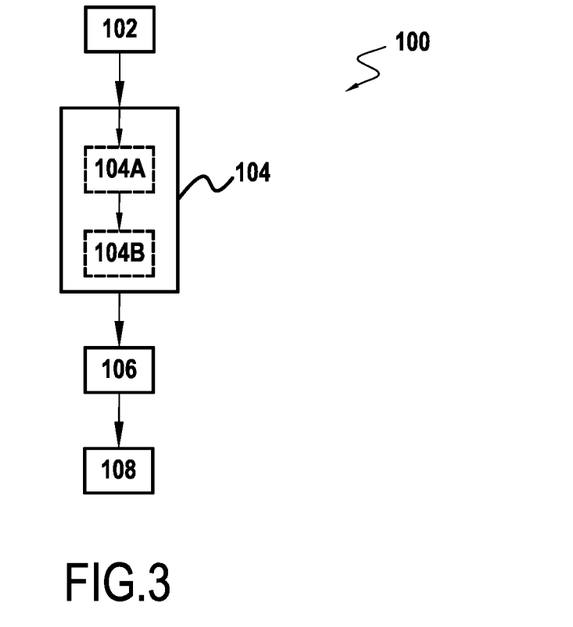
FIG. 3 shows a flow chart of the method according to embodiments of the present disclosure.

FIG. 3 shows a flow chart of the method 100 of manufacturing the metallic ball pen tip 14 for the writing instrument 10 according to embodiments of the present disclosure.

Figure 4:
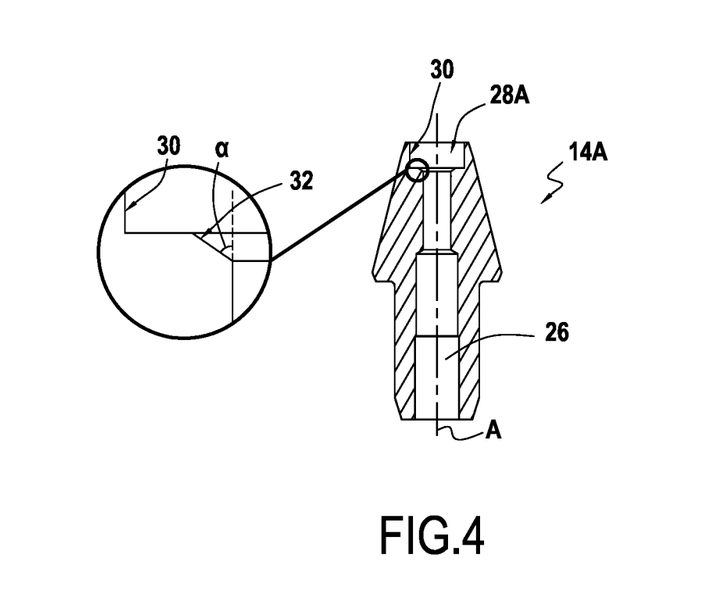
FIG. 4 shows an exemplary metallic ball pen tip preform according to embodiments of the present disclosure.

The method 100 may comprise a step of providing 102 a preform 14A of the metallic ball pen tip 14 comprising the feeding passage 26 and a housing preform 28A. As shown in FIG. 4, in the preform 14A, the housing preform 28A may be defined by the cylindrical wall 30 and a ball seat preform wall 32. The ball seat preform wall 32 may be a conical wall and may form an angle α with the axial direction A. For example, the angle α may be equal to 45°.

The method 100 may comprise a step of machining 104 the ball seat preform wall 32 so as to obtain a stepped wall 34.

The step of machining 104 the ball seat preform wall 32 may be carried out in two steps. A first step 104A of machining a first group of steps 36 and a second step 104B of machining a second group of steps 36. This is a non-limiting example and the step of machining the balls seat preform wall 32 may be carried out in more than two steps.

Figure 5:
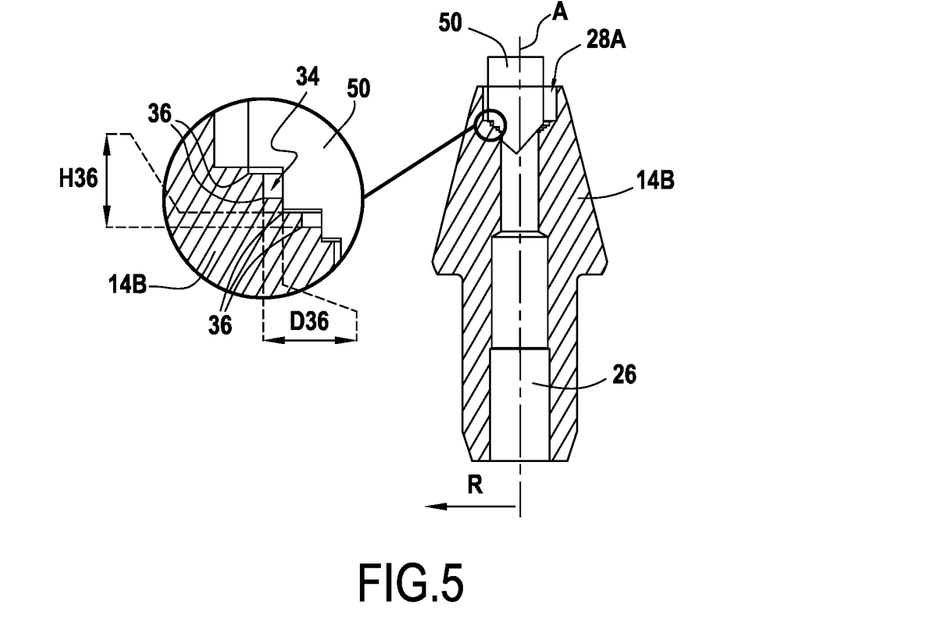
FIG. 5 shows a cross-section of a machined preform according to embodiments of the present disclosure.

As shown in the enlargement of FIG. 5, the steps 36 of the first group may be alternated with the steps 36 of the second group.

The step of machining 104 the ball seat preform wall 32 may be carried out using a machining tool 50, as shown in FIG. 5. As shown in FIG. 5, the machining tool 50 may be used during the second step 104B to machine the second group of steps 36, which are alternated with the first group of steps 36 already machined in the first step 104A of machining, so as to obtain a machined preform 14B.

Figure 6:
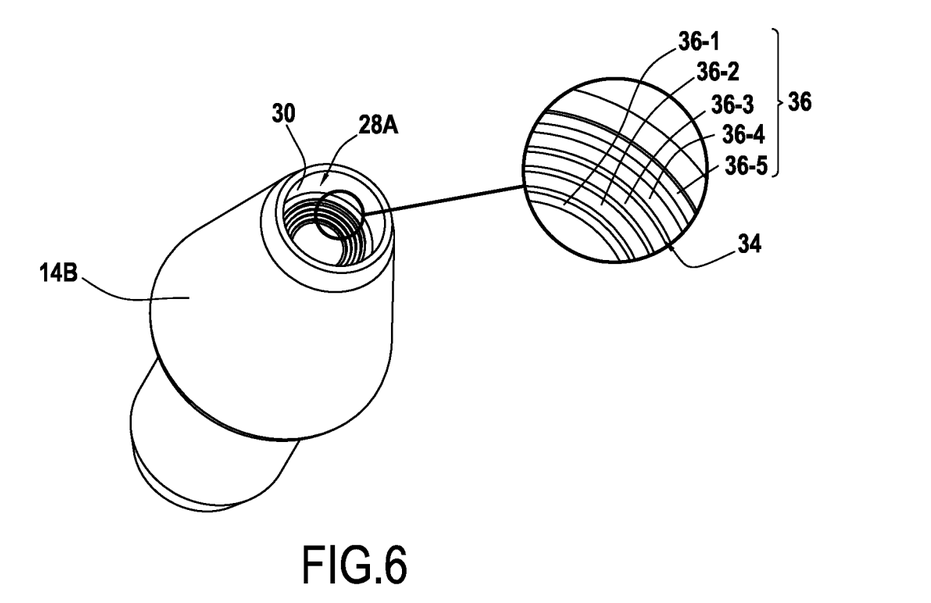
FIG. 6 shows the machined metallic ball pen tip of FIG. 5.

As shown in the enlarged portion of FIG. 6, the steps 36 may each have a height H36, measured in the axial direction A, and a depth D36, measured in a radial direction R, perpendicular to the axial direction A.

As shown in the enlarged portion of FIG. 6, the stepped wall 34 of the machined preform 14B may comprise five steps 36-1, 36-2, 36-3, 36-4, 36-5. Each step 36-1, 36-2, 36-3, 36-4, 36-5 may have a height measured in the axial direction A and a depth measured in the radial direction R. Step 36-5 may have a height H36-5 equal to 14 μm and a depth D36-5 equal to 30 μm. Step 36-4 may have a height H36-4 equal to 50 μm and a depth D36-4 equal to 40 μm. Step 36-3 may have a height H36-3 equal to 29 μm and a depth D36-3 equal to 38 μm. Step 36-2 may have a height H36-2 equal to 30 μm and a depth D36-2 equal to 40 μm. Step 36-1 may have a height H36-1 equal to 29 μm and a depth D36-1 equal to 25 μm. This is only a non-limiting example and the stepped wall 34 may comprise a different number of steps 36.

As an alternative, the step of machining the ball seat preform wall 32 may be carried out in one step with a machining tool. The machining tool has a cutting shape corresponding to the shape of the stepped wall 34. In this non-limiting example, the steps are all machined at the same time in one machining step.

The method 100 may comprise a step of broaching 106 the feeding grooves 38 in the stepped wall 34.

The method 100 may comprise a step of coining 108 the stepped wall 34 with a coining tool 52 comprising a spherical die 54, so as to obtain the ball seat 40.

The spherical die 54, and the coining tool 52, may be made of hard carbides, specifically tungsten carbide.

The spherical die 54 may be pressed in the axial direction A with a force F equal to or greater than 40 N, specifically equal to or greater than 93 N.

The coining step 108 may allow deforming the steps 36 of the stepped wall 34 and providing a non-smooth surface with a texture to the ball seat 40. The deformation of the steps 36 may be visible on the textured ball seat 40 and identified as being made by the deformation of a stepped wall.

Figure 12:
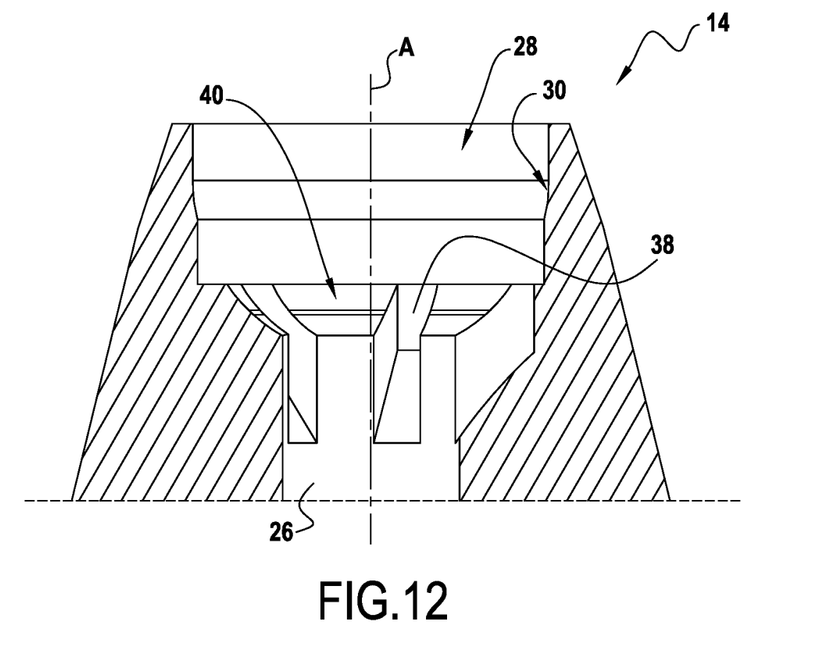
FIG. 12 shows a cross-section of another exemplary metallic ball pen tip for a writing instrument with a textured ball seat according to embodiments of the present disclosure obtained from the preform of FIG. 9.

FIG. 12 shows another exemplary metallic ball pen tip 14. The exemplary metallic ball pen tip 14 of FIG. 12 is similar to the exemplary metallic ball pen tip of FIG. 7.

The exemplary metallic ball pen tip 14 of FIG. 12 may comprise a feeding passage 26 extending in the axial direction A. The feeding passage 26 may extend from one axial end of the metallic ball pen tip 14 to a housing 28. The housing may be defined by a cylindrical wall 30 and a ball seat 40. The ball seat 40 may comprise a plurality of feeding grooves 38. The feeding grooves 38 may allow the ink 22 to flow from the ink reservoir 20 into the housing 28, especially when the ball 24 is received in the housing 28.

As shown in FIG. 12, the ball seat 40 is textured.

The exemplary metallic ball pen tip 14 of FIG. 12 is obtain by the same method of manufacturing the metallic ball pen tip 14 of FIG. 7 for the writing instrument 10.

Figure 9:
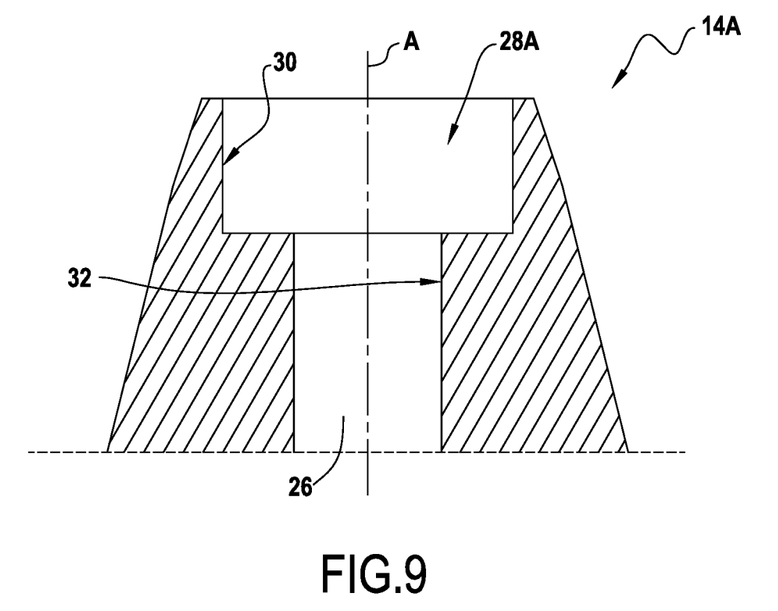
FIG. 9 shows another exemplary metallic ball pen tip preform according to embodiments of the present disclosure.

The method 100 may comprise a step of providing 102 a preform 14A of the metallic ball pen tip 14 comprising the feeding passage 26 and a housing preform 28A. As shown in FIG. 9, in the preform 14A, the housing preform 28A may be defined by the cylindrical wall 30 and a ball seat preform wall 32. The ball seat preform wall 32 may form an angle α with the axial direction A. For example, the angle α may be equal to 0°.

The method 100 may comprise a step of machining 104 the ball seat preform wall 32 so as to obtain a stepped wall 34.

Figure 10:
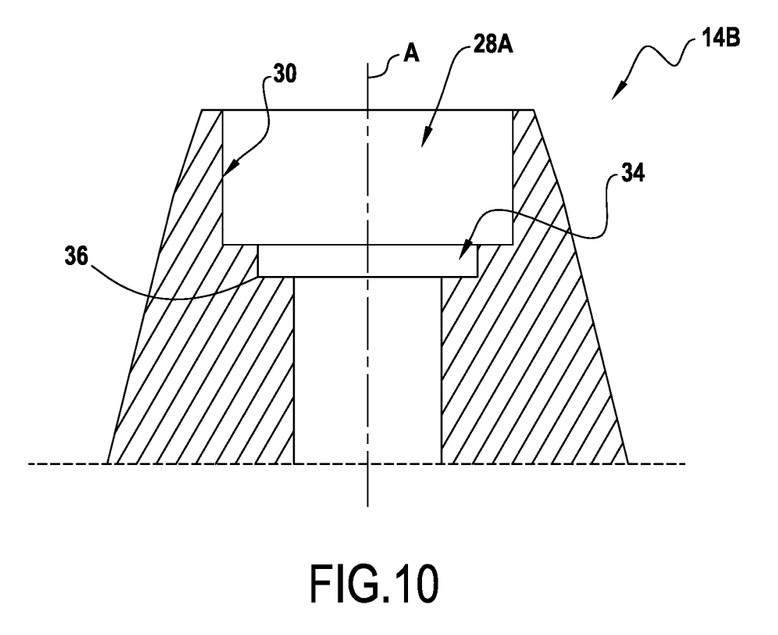
FIG. 10 shows a cross-section of the machined preform of the preform of FIG. 9.

As shown in FIG. 10, the step of machining the ball seat preform wall 32 may be carried out in one step. As shown in FIG. 10, the stepped wall 34 of the machined preform 14B may comprise one step 36. This is only a non-limiting example and the stepped wall 34 may comprise a different number of steps 36.

Figure 11:
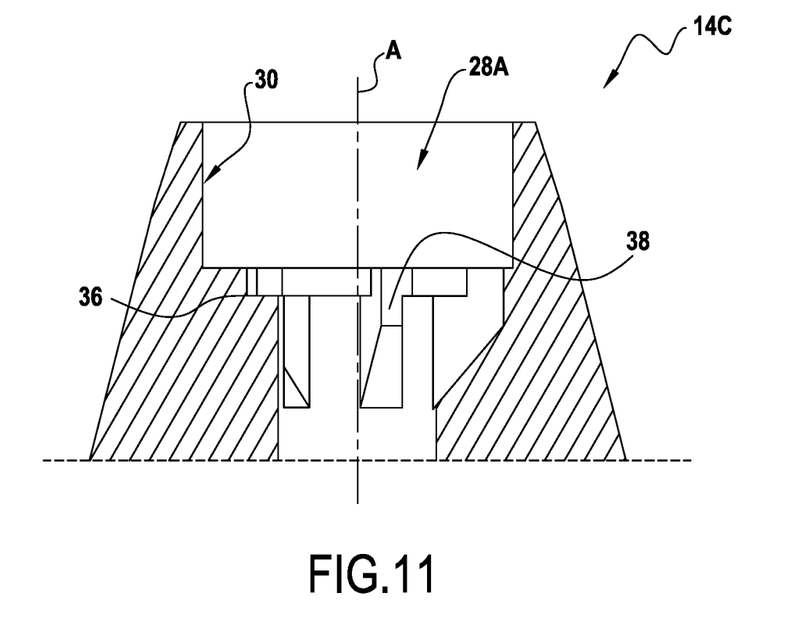
FIG. 11 shows a cross-section of the machined preform of FIG. 10 after the broaching step.

The method 100 may comprise a step of broaching 106 the feeding grooves 38 in the stepped wall 34. FIG. 11 shows a cross-section of the broached preform 14C, i.e., the machined preform 14B after the step of broaching 106 the feeding grooves 38 in the stepped wall 34.

The method 100 may comprise a step of coining 108 the stepped wall 34 with a coining tool 52 comprising a spherical die 54, so as to obtain the ball seat 40.

The spherical die 54, and the coining tool 52, may be made of hard carbides, specifically tungsten carbide.

The spherical die 54 may be pressed in the axial direction A with a force F equal to or greater than 40 N, specifically equal to or greater than 93 N.

The coining step 108 may allow deforming the step 36 of the stepped wall 34 and providing a non-smooth surface with a texture to the ball seat 40. The deformation of the steps 36 may be visible on the textured ball seat 40 and identified as being made by the deformation of a stepped wall.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method of manufacturing a metallic ball pen tip for a writing instrument comprising a feeding passage extending in an axial direction, the feeding passage reaching in a housing configured to receive a ball, the housing being defined by a cylindrical wall and a ball seat, wherein the ball seat comprises a plurality of feeding grooves and wherein the ball seat is textured, the method comprising the steps of:
    providing a preform of the metallic ball pen tip comprising the feeding passage and a housing preform, the housing preform being defined by the cylindrical wall and a ball seat preform wall;
    machining the ball seat preform wall so as to obtain a stepped wall;
    broaching the feeding grooves in the stepped wall;
    coining the stepped wall with a spherical die so as to obtain the textured ball seat.

2. The method according to claim 1, wherein the ball seat preform wall forms an angle with the axial direction equal to or greater than 0° and equal to or smaller than 80°.

3. The method according to claim 1, wherein the ball seat preform wall forms an angle with the axial direction equal to or greater than 20° and equal to or smaller than 55°.

4. The method according to claim 1, wherein the machining of the ball seat preform wall removes material from a portion of the ball seat preform, proximal to the opening of the feeding passage, and extends in an axial direction towards an ink reservoir of the writing instrument, wherein the machining of the ball seat preform wall is carried out in two steps, a first step of machining a first group of steps and a second step of machining a second group of steps.

5. The method according to claim 4, wherein the steps of the stepped wall each include a progressively smaller radius as measured relative to a central longitudinal axis that extends along a length of the writing instrument,
    such that a first step is located adjacent to the housing and has a radius relative to the central longitudinal axis; a second step, immediately adjacent to the first step in a direction away from an opening of the ball tip, having a radius smaller than the radius of the first step; and a third step, immediately adjacent to the second step and in a direction away from the opening of the ball tip, having a radius smaller than that of the radius of the first step and the radius of the second step, and
    wherein the steps of the first group alternate with the steps of the second group.

6. The method according to claim 1, wherein each step has a depth, measured in a radial direction perpendicular to the axial direction, equal to or greater than 10 μm and equal to or smaller than 50 μm.

7. The method according to claim 1, wherein each step has a depth, measured in a radial direction perpendicular to the axial direction, equal to or greater than 25 μm and equal to or smaller than 40 μm.

8. The method according to claim 1, wherein each step has a height, measured in the axial direction, equal to or greater than 10 μm and equal to or smaller than 60 μm.

9. The method according to claim 1, wherein each step has a height, measured in the axial direction, equal to or greater than 13 μm and equal to or smaller than 50 μm.

10. The method according to claim 1, wherein the spherical die is pressed in the axial direction with a force equal to or greater than 40 N.

11. The method according to claim 1, wherein the spherical die is pressed in the axial direction with a force equal to or greater than 93 N.

12. The method according to claim 1, wherein the spherical die is made of hard carbides.

13. The method according to claim 1, wherein the spherical die is made of tungsten carbide.

14. The method according to claim 1, wherein the stepped wall comprises five steps.

15. The method according to claim 1, wherein the metallic ball pen tip is made of a metallic alloy comprising brass.

16. The method according to claim 1, wherein the metallic ball pen tip is made of a metallic alloy comprising nickel silver.

17. The method according to claim 1, wherein the metallic ball pen tip is made of a metallic alloy comprising stainless steel.

18. A metallic ball pen tip for a writing instrument manufactured by the method according to claim 1.

19. The method of claim 1, wherein the stepped wall is proximal to an opening of the feeding passage and within an interior of the preform of the metallic ball pen tip.

20. The method of claim 1, wherein each step of the stepped wall includes a flat surface that faces an opening of the ball tip, wherein each flat surface is substantially perpendicular to a central longitudinal axis that extends through the writing instrument.

* * * * *